United States Patent [19]

Cater et al.

[11] Patent Number: 5,043,080

[45] Date of Patent: Aug. 27, 1991

[54] TREATING CONTAMINATED EFFLUENTS AND GROUNDWATERS

[75] Inventors: Stephen R. Cater, Willowdale; Pauline M. Brown, Toronto; J. Adele Buckley, Willowdale; R. D. Samuel Stevens, Aurora, all of Canada

[73] Assignee: Solarchem Enterprises Inc., Richmond Hill, Canada

[21] Appl. No.: 484,282

[22] Filed: Feb. 26, 1990

[51] Int. Cl.[5] .................................. C02F 1/32
[52] U.S. Cl. .................................. 210/748; 210/754; 210/759; 210/763; 210/908; 210/909
[58] Field of Search ............... 210/748, 754, 759, 763, 210/908, 909

[56] References Cited

U.S. PATENT DOCUMENTS

| 4,012,321 | 3/1977 | Koubek | 210/759 |
|---|---|---|---|
| 4,167,973 | 9/1979 | Forte et al. | 210/908 |
| 4,321,143 | 3/1982 | Wilms et al. | 210/631 |
| 4,446,029 | 5/1984 | Betermier et al. | 210/748 |
| 4,512,900 | 4/1985 | Macur et al. | 210/748 |
| 4,604,214 | 8/1986 | Carr et al. | 210/759 |
| 4,849,114 | 7/1989 | Zeff et al. | 210/747 |
| 4,861,484 | 8/1989 | Lichtin et al. | 210/759 |
| 4,892,664 | 1/1990 | Miller | 210/747 |

FOREIGN PATENT DOCUMENTS 62-2282688 12/1987 Japan .................................. 210/754

OTHER PUBLICATIONS

Jefcoate, C. R. E.; Smith, J. R. L.; and Norman, R. O. C.; *Hydroxylation, Part IV. Oxidation of Some Benzenoid Compounds by Fenton's Reagent and The Ultraviolet Irradiation of Hydrogen Peroxide*, J. Chem. Soc. (B), 1969 pp. 1013–1018.

Lunak, S.; Sedlak, P.; and Veprek-Siska, J.; *Photolysis of Hydrogen Peroxide. Photocatalytic Effects of Cu(II) and Reaction Kinetics* Collection Czecholovak Chem. Commun. (1986) vol. 51 pp. 973–981.

Sedlak, P.; Lunak, S.; and Lederer, P.; *Comparison of Photocatalitic Activities of 3rd Transition Metal Ions for Hydrogen Peroxide Photolysis and Photoinitiated Hydroxylation of 2-Hydroxybenzoic Acid* Collection Czechoslovak Chem. Commun. (1987) vol. 52 pp. 2451–2456.

Guoshou, X. et al.; *Oxidation of Refractory Organic Wastewater With Hydrogen Peroxide in the Presence of UV Irradiation and Catalyst Ferrous Ion* translated from China Environmental Science, vol. 8, No. 3, Jun. 1988.

*Primary Examiner*—Peter Hruskoci
*Attorney, Agent, or Firm*—Rogers, Bereskin & Parr

[57] ABSTRACT

A method of treating a liquid effluent or groundwater containing organic contaminants is provided. The liquid effluent or groundwater containing the organic contaminants is contacted with hydrogen peroxide and transition metal ions. The hydrogen peroxide and transition metal ions are present in effective amounts based on the concentration of the organic contaminants in the liquid effluent or groundwater. The liquid effluent or groundwater is then irradiated with UV light having a polychromatic output between about 200 to 400 nm to decompose the organic contaminants. The ratio of hydrogen peroxide to transition metal ions is selected so as to favor the absorption of UV light by the hydrogen peroxide in the irradiation step.

10 Claims, 6 Drawing Sheets

FIG. 1

FIG. 5
TNT

FIG. 6
WOOD TREATING SITE - GROUND WATER

TREATING CONTAMINATED EFFLUENTS AND GROUNDWATERS

FIELD OF THE INVENTION

The invention relates to methods for removing organic contaminants from liquid effluents or groundwaters. More particularly, the invention relates to a process for removing organic contaminants by treating with hydrogen peroxide in the presence of transition metal ions, and irradiating with ultraviolet light.

BACKGROUND OF THE INVENTION

It is known that Fenton's reagent comprising hydrogen peroxide and a ferrous ion source is a strong oxidation reagent. There have been many studies investigating the mechanism of the oxidative reaction of organic compounds by this Fenton's reagent. In particular, studies by Norman, R.O.C. et al. (J. Chem. Soc., B, 1099, 1970) and Walling, C., et al; (J. Am. Chem. Soc. 95, 948, 1973) indicated that the oxidative reactions of organic compounds by Fenton's reagent was based on the free radical reaction of •OH which was produced by the reaction of ferrous ion with hydrogen peroxide.

U.S. Pat. No. 4,102,312 discloses the use of ultraviolet light to irradiate hydrogen peroxide to enhance the oxidation ability of hydrogen peroxide. Jefcoate, C.R.E., et al (J. Chem Soc., B., 1013, 1969) have also compared the oxidizing characteristics of a reagent system using UV irradiation and $H_2O_2$ and a treatment system using Fenton's reagent in the hydroxylation of benzene derivatives.

There are a number of studies where the photocatalytic effects of 3d transition metal ions on the photolysis of hydrogen peroxide have been investigated. Sedlak, P., et al (Collection Czechoslovak Chem. Commun., 52, 2451, 1987) measured the quantum yields of $H_2O_2$ photolysis and photoinitiated hydroxylation of 2-hydroxybenzoic acid in the presence of 3d transition metals and observed marked photocatalytic effects only for $Cu^{2+}$ in $H_2O_2$ photolysis and for $Fe^{3+}$ in photoinitiated hydroxylation of 2-hydroxybenzoic acid. Further studies on the photocatalytic effects of $Cu^{2+}$ by the same investigators indicated that the high quantum yields of hydrogen peroxide are due to thermal decomposition of hydrogen peroxide catalyzed by photochemically generated copper ions in oxidation states which are catalytically active (Lunak, S., et al, Collection Czechoslovak Chem. Commun., 51 973, 1986).

Xia, Guoshou et al (China Environmental Science, 8(3), June 1988) studied the effects of various reaction conditions in the treatment of nitrobenzene and nitrotoluene using hydrogen peroxide and $Fe^{2+}$ and $Cu^{2+}$ in the presence of UV irradiation or sunlight. The UV light source used in the study was a low pressure mercury arc with helix shape and 20 W power. This light source was essentially a monochromatic light source with output at 254 nm. The maximum elimination efficiency was obtained when both $Fe^{2+}$ and $Cu^{2+}$ were used as the catalyst and hydrogen peroxide was added in batches.

The processes suggested in the literature suffer from a number of disadvantages. Many of the organic contaminants most commonly found in effluents and groundwaters, such as ethers, aromatics, chlorinated aromatics etc, would not be efficiently removed using these processes since high concentrations of iron ions would be needed which results in a treated water product requiring further treatment steps to remove the iron before it may be discharged into the environment. The processes suggested in the literature also do not recognize the importance of $H_2O_2$ absorbance and the photochemical conversion of the transition metals, particularly when operating the process on a commercial scale.

SUMMARY OF THE INVENTION

The present inventors have found that organic contaminants from many different classes of organic contaminants may be efficiently removed from liquid effluents and groundwaters using a method employing hydrogen peroxide, transition metal ions and a UV irradiation step, if a UV light source having a polychromatic output between about 200 to 400 nm is used. The ratio of hydrogen peroxide to transition metal ions is also selected to favor the absorption of UV light by the hydrogen peroxide. The use of a light source having a polychromatic output between about 200 to 400 nm in the method of the invention requires that lower concentrations of hydrogen peroxide be employed in the method resulting in efficient removal of the contaminants. The present inventors have also unexpectedly found that in the case of organic compounds which do not absorb light above 200 nm, their method results in greater decomposition of the organic contaminants than can be expected by combining separate treatments. Thus, the present inventors have demonstrated the synergy of their method.

Therefore, the present invention provides a method of treating a liquid effluent or groundwater containing one or more organic contaminants comprising the steps of:

(a) providing an effluent or groundwater containing one or more organic contaminants;

(b) contacting the effluent or groundwater with hydrogen peroxide and transition metal ions, the hydrogen peroxide and transition metal ions being present in effective amounts based on the concentration of the organic contaminants in the effluent or groundwater; and (c) irradiating the effluent or groundwater containing hydrogen peroxide with UV light having a polychromatic output between about 200 to 400 nm to decompose the organic contaminants;

wherein the ratio of hydrogen peroxide to transition metal ions is selected so as to favor the absorption of UV light by the hydrogen peroxide relative to the absorption of UV light by the transition metal ions in step (c).

In a preferred embodiment of the method, the transition metal ions are iron ions ($Fe^{2+}$ and/or $Fe^{3+}$) and the weight ratio of $H_2O_2$ to iron ions is about 10:1 to 1:1.

BRIEF DESCRIPTION OF THE DRAWINGS

For a better understanding of the present invention reference will be made, by way of example, to the following drawings.

DETAILED DESCRIPTION OF THE INVENTION

In general, liquid effluents or groundwaters are treated by the process of the present invention. Liquid effluents and groundwaters include industrial wastewater or contaminated groundwater resulting from leakage or spills from underground storage tanks or at industrial disposal sites. Typical organic contaminants in such wastes include aromatic and polyaromatic hydrocarbons such as benzene, toluene, xylene, napthalene, anthracene; chlorinated or nitrated aromatics, such as chlorobenzenes, nitrobenzenes, nitrotoluenes; chlorinated organics such as polychlorinated biphenyls (PCBS) trichloroethane, trichloroethylene, chloroform; dioxane, ketones, and alcohols.

A large number of toxic or hazardous organic compounds may be decomposed using the process of the invention, since most of them can be photooxidized or photodecomposed. The term photooxidation refers to the decomposition of an organic contaminant by an oxidant (for example, hydrogen peroxide) in the presence of UV light. The term photodecomposition refers to the decomposition with UV light of an organic contaminant without the presence of any oxidant, except oxygen and/or air which may be dissolved in the liquid effluent or groundwater.

Classes of organic contaminants which have been demonstrated with the process of the invention include ethers, aromatics, polyaromatics, nitroaromatics, chlorinated aromatics and phenols. In particular, the organic contaminants may be compounds selected from the group of compounds consisting of an alkyl or alkenyl which may be linear, branched or cyclic preferably having 1 to 20 carbon atoms which may be substituted by one or more of fluorine, chlorine, bromine, nitro, sulfo, carboxyl, hydroxyl or $C_1$-$C_{10}$-alkoxy, preferably trichloroethane, trichloroethylene, and chloroform, an aromatic or polyaromatic compounds which may be substituted by one or more of alkyl or alkenyl which may be linear or branched and preferably having 1 to 10 carbon atoms, fluorine, chlorine, bromine, nitro, sulfo, carboxyl, hydroxyl or $C_1$-$C_{10}$-alkoxy, preferably benzene, toluene, biphenyls and phenolics which may be substituted by the abovementioned substituents for aromatics or polyaromatics, xylene, chlorobenzene, trinitrotoluene, PCBs, napthalene and anthracene; fused phenols, preferably dioxins; and ethers, preferably dioxane.

Particularly preferred organic contaminants which may be treated by the process of the invention include benzene, toluene, xylene, chlorobenzenes, polyaromatic hydrocarbons (napthalene, anthracene), trichloroethane, trichloroethylene, dioxane, ketones, alcohols, PCBS, chloroform and trinitrotoluene.

In accordance with the process of the invention, the liquid effluent or groundwater is contacted with hydrogen peroxide and transition metal ions which are present in effective amounts based on the concentration of the organic contaminants in the effluent or groundwater. It is desirable that the ratio of hydrogen peroxide to transition metal ions is selected so as to favor the absorption of UV light by the hydrogen peroxide in the irradiation step. The liquid effluent or groundwater containing hydrogen peroxide and transition metal ions is then irradiated with UV light. The UV light is selected such that the hydrogen peroxide substantially absorbs the UV light relative to the absorption of the UV light by the transition metal ions, to decompose the organic contaminants to less toxic compounds. In general, decomposition should be allowed to proceed to complete oxidation resulting in the following constituent elements:

| Contaminant Class | Decomposition Products |
| --- | --- |
| Hydrocarbon | $CO_2$, $H_2O$ |
| Chlorinated Hydrocarbon | $CO_2$, $H_2O$, $Cl^-$ |
| Organic Nitrogen Compound | $CO_2$, $H_2O$, $NO_3^-$ |
| Organic Sulphur Compound | $CO_2$, $H_2O$, $SO_4^-$ |

It is believed that the following reactions may occur in the method of the present invention wherein the transition metal ions used are iron ions:

$$RH \xrightarrow{h\nu} \text{decomposition products}$$

$$Fe^{2+} + H_2O_2 \longrightarrow Fe^{3+} + OH^- + OH\bullet$$

$$Fe^{3+}\text{-}[H_2O] \xrightarrow{h\nu} Fe^{2+} + OH\bullet + H^+$$

$$Fe^{2+}\text{-}[H_2O] \xrightarrow{h\nu} Fe^{3+} + OH^- + H\bullet$$

$$Fe^{3+} + H_2O_2 \longrightarrow Fe^{2+} + HO_2\bullet + H^+$$

$$RH + OH\bullet \longrightarrow R\bullet + H_2O$$

The foregoing reaction mechanism provides for the photochemical conversion of the iron ions. In view of this reaction mechanism, it is thus desirable to choose the UV lamp such that its output spectrum supplies UV for absorption by $H_2O_2$, organic contaminants and iron ions. It is also desirable that the ratio of hydrogen peroxide to iron ions be selected such that absorption of UV light by the hydrogen peroxide is favored.

Hydrogen peroxide is preferably added to the liquid effluent or groundwater as an aqueous solution. A sufficient amount of hydrogen peroxide is added based on the concentration of the organic contaminants in the liquid effluent or groundwater. It is appreciated that not all of the organic contaminants have to be removed from a liquid effluent or groundwater to provide an environmentally acceptable liquid effluent or groundwater. Therefore, less quantities of hydrogen 5 peroxide may be used. To determine the amount of $H_2O_2$ to employ, the total organic content of the liquid effluent or groundwater may be measured by known techniques and the amount of $H_2O_2$ needed in the method of the invention to remove the desired organic contaminant or portion thereof can be readily l0 calculated. Typically for purposes of this invention up to about 5 ppm of $H_2O_2$ are added per 1 ppm of organic contaminants in the liquid effluent or groundwater.

The source of transition metal ions is selected so as to provide for optimal removal efficiency. Particular anions with which the transition metal ions are added (for example, $Cl^-$, $SO_4^{2-}$) may improve the removal efficiency. Copper, zinc and/or iron compounds are preferably used as sources of transition metal ions, iron compounds being most particularly preferred. Iron compounds such as $Fe(OH)_3$, $Fe_2O_3$, $FeCl_3$, $Fe_2(SO_4)_3$, $FeO$, $Fe(OH)_2$, $FeCl_2$, $FeCO_3$ or $FeSO_4$ may be used in the process of the present invention. Preferably, $FeSO_4 \cdot 7H_2O$ may be used as the source of iron ions.

The concentration of transition metal ions is selected based on the concentration of the organic contaminants in the liquid effluent or groundwater, and desired removal of the organic contaminants. The ratio of hydrogen peroxide to transition metal ions is selected so as to favor the absorption of UV light by the hydrogen peroxide and the organic contaminants in the irradiation step. The concentration of transition metal ions is generally below environmentally acceptable discharge levels for the metal compounds so that additional treatment steps are not required. The process of the invention is typically carried out with a ratio of hydrogen peroxide to iron ions of about 10:1 to 1:1, preferably 5:1 to 1, most particularly preferred 3:1.

The hydrogen peroxide and transition metal ions should desirably be mixed into the liquid effluent or groundwater as effectively as possible in order to maximize the removal effectiveness of the hydrogen peroxide and iron ions in the method. The liquid effluent or groundwater containing the hydrogen peroxide and transition metal ions may be passed through a turbulent mixer (for example, a static in-line mixer, venturi, stirred tank) to the irradiation step.

The liquid effluent or groundwater is contacted with the hydrogen peroxide and transition metal ions at an acidic pH. Preferably, this step is carried out at a pH of between 2 and 4, preferably 3. The method is typically carried out at or near atmospheric pressure and at about room temperature. However, the method may be carried out at temperatures from about 0° to 100° C. so long as the effluent or groundwater is a liquid.

The UV irradiation step utilizes UV light with a polychromatic output from about 200 to 400 nm, most preferably 200 to 300 nm. Medium/high pressure mercury arc lamps (Solarchem, Richmond Hill, Ontario, Canada) are exemplary. Input powers of 1 kW to 30 kW are typically used.

In accordance with the objects and principles of the invention, and the accompanying drawings, a water-treatment apparatus for removing organic contaminants from effluents or groundwater is provided. In the form shown in FIG. 1, the apparatus includes a feed solution tank 2, a UV reactor 4 containing a quartz tube equipped with UV lamps 6, a sample port 8 and a pump 10.

Figure 1:
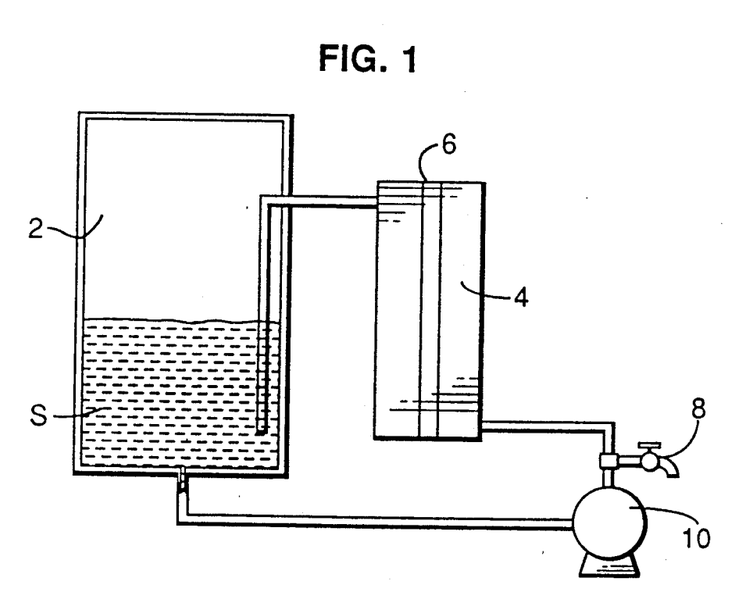
FIG. 1 is a schematic diagram of the process of the present invention.

Contaminated water S is delivered to the feed solution tank 2 wherein the contaminated water S comes into contact with hydrogen peroxide and transition metal ions. The contaminated water S containing $H_2O_2$ and transition metal ions are pumped, by means of the pump 10, into the UV reactor 4 and then subjected to UV irradiation in the UV reactor 4. The water so treated is then returned to the feed solution tank 2 and then recirculated through the UV reactor 4 until the desired removal is achieved. Samples of treated water are withdrawn at the sample port 8.

It will be understood by those skilled in the art that the $H_2O_2$ and the transition metal ions may be introduced before or after the contaminated water S is passed through the pump 10. The contaminated water containing $H_2O_2$ and transition metal ions may also be passed through a turbulent mixer prior to being circulated through the UV reactor 4 and the water is treated in a once through process.

The following examples are given for purposes of illustrating the novel process of the invention. However, it is to be understood that these examples are merely illustrative in nature and that the present invention is not necessarily limited thereto.

EXAMPLE 1

A comparison was made of the rate of decomposition in a water sample containing dioxane using a $UV/H_2O_2$ treatment system and a $UV/H_2O_2/Fe^{2+}$ treatment system. More particularly, an apparatus as shown in FIG. 1 and as generally described above was used to remove dioxane from a water sample containing dioxane. The total volume of the water sample and $H_2O_2$ and/or $Fe^{2+}$ in the feed solution tank was 10 l. A water sample containing approximately 100 ppm dioxane was prepared in the feed solution tank. Hydrogen peroxide (100 ppm) was then added to the water sample in the tank. The pH of the solution in the tank was maintained at pH 3. The solution was recirculated through a UV reactor containing a 25 W low pressure mercury arc model #604 obtained from Trojan Technologies, London, Ontario. All UV output was at 254 nm and was 6.4 W. Samples were withdrawn for analysis at reaction times of 15, 20, 45 and 60 minutes.

The above method was repeated using a water sample containing approximately 100 ppm dioxane and adding iron ions (20 ppm) as $FeSO_4 \cdot 7H_2O$, after the addition of hydrogen peroxide.

Figure 2:
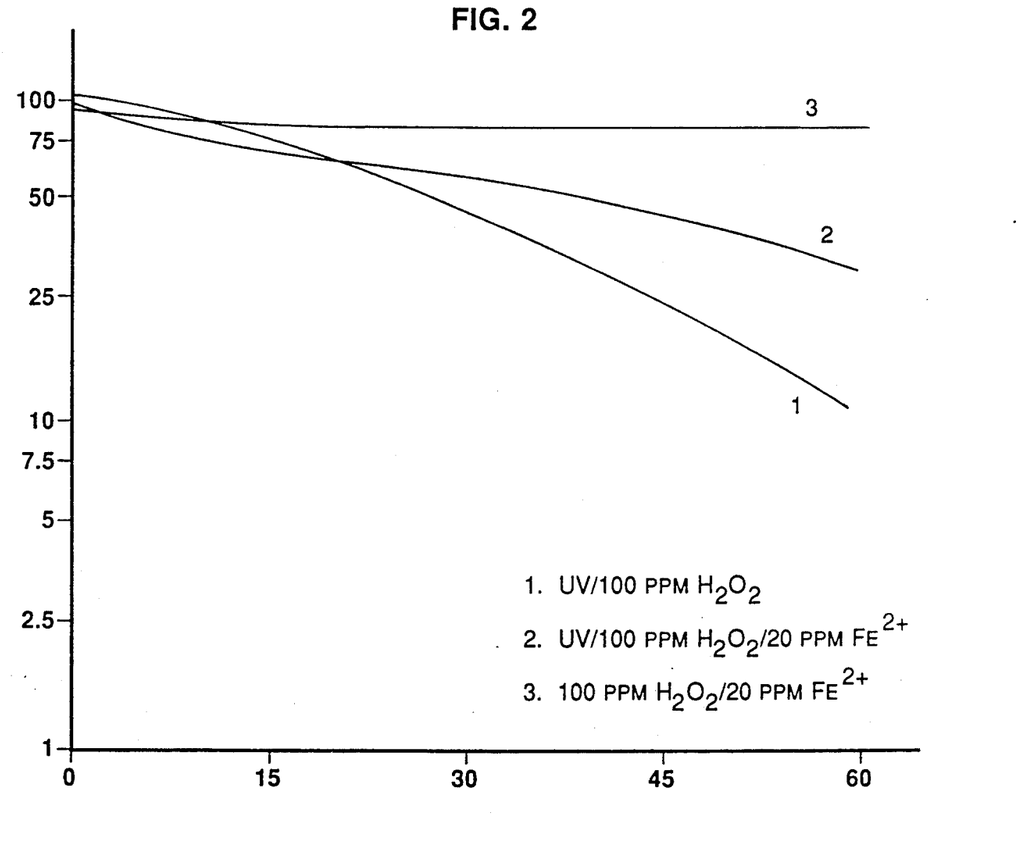
FIG. 2 is a graph showing on a semi-log plot dioxane concentration versus time for $UV/H_2O_2/Fe^{2+}$, $UV/H_2O_2$, and $H_2O_2/Fe^{2+}$ treatment systems with a low pressure mercury arc with monochromatic output at 254 nm.

The results contained in Table I and graphically represented in FIG. 2, indicate that the addition of iron ions utilizing a monochromatic light source of 254 nm, impeded the decomposition of dioxane. The $Fe^{2+}/Fe^{3+}$ may absorb more light than the $H_2O_2$ in the method using $UV/H_2O_2/Fe^{2+}$ and therefore the decomposition rate of dioxane is lower than in the method using $UV/H_2O_2$.

EXAMPLE 2

A comparison was made of the rate of decomposition of dioxane in a water sample containing dioxane using a UV reactor containing a medium pressure UV lamp (Solarchem, Richmond Hill, Ontario, Model No. RA 30001) in a $UV/H_2O_2$ treatment system and a $UV/H_2O_2/Fe^{2+}$ treatment system. More particularly, an apparatus as shown in FIG. 1 and as described above was used to remove dioxane from a water sample containing dioxane. The total volume of the water sample and $H_2O_2$ and/or iron ions in the feed solution tank was 200 l. A water sample containing approximately 100 ppm dioxane was prepared in the feed solution tank. Hydrogen peroxide (100 ppm) was then added to the water sample in the tank. The pH of the solution in the tank was maintained at pH 3 using sulphuric acid. The resulting solution was circulated through the UV reactor batchwise for 15, 30, 45 and 60 minutes. The UV reactor contained a medium/high pressure mercury arc lamp with polychromatic output in the 200-400 nm range (Solarchem, Richmond Hill, Ontario, Model No. RB 30033).

The above method was repeated using a water sample containing approximately 100 ppm dioxane and adding iron ions (20 ppm) as $FeSO_4 \cdot 7HO_2O$.

Figure 3:
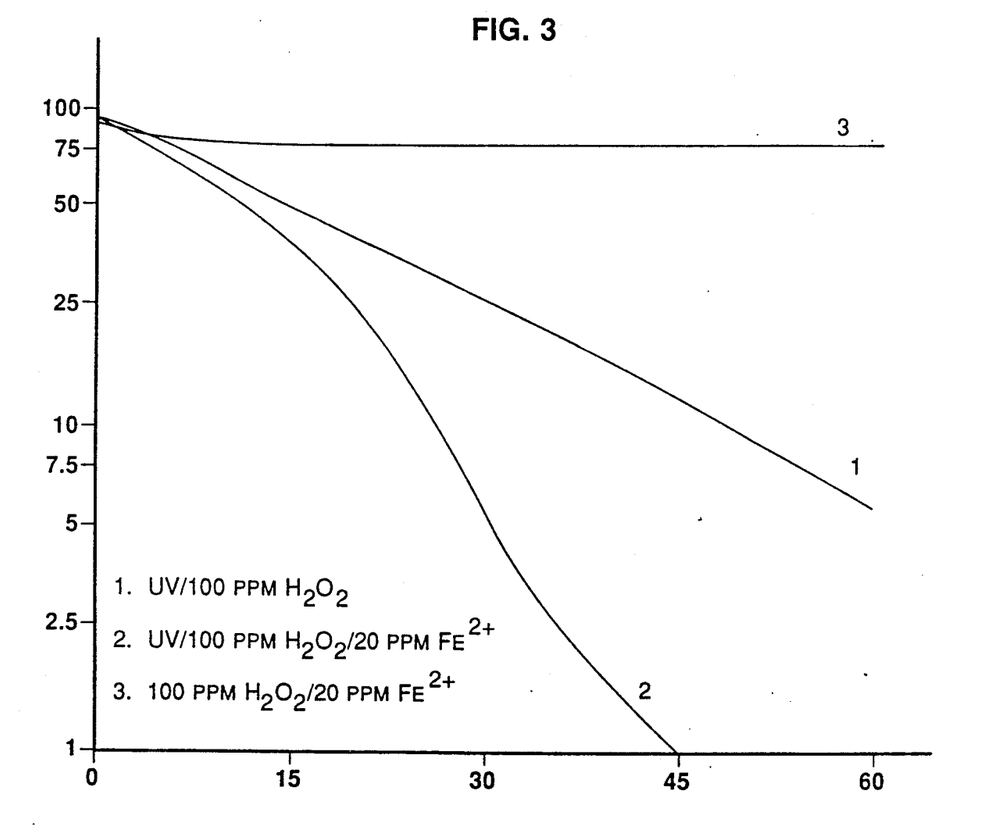
FIG. 3 is a graph showing on a semi-log plot dioxane concentration versus time for $UV/H_2O_2/Fe^{2+}$, $UV/H_2O_2$ and $H_2O_2/Fe^{2+}$ treatment systems with a medium./high pressure arc with polychromatic output in the range of 200–400 nm.

The results contained in Table II and graphically represented in FIG. 3, indicate that the addition of iron ions to the treatment system utilizing a UV reactor containing a lamp with polychromatic output in the 200-400 nm range, increases the decomposition rate of dioxane by a factor of 2.5. The UV absorption spectrum of dioxane demonstrates that this contaminant does not significantly absorb light above 200 nm. This example demonstrates that the UV absorbed by the $H_2O_2$ and $Fe^{2+}/Fe^{3+}$ alone is sufficient to obtain the improvement in the $UV/H_2O_2/Fe^{2+}$ system. The synergy of the system was demonstrated by comparing the results of $UV/H_2O_2$ and $H_2O_2/Fe^{2+}$ treatment systems with the $UV/H_2O_2/Fe^{2+}$ treatment system. The results in Table 2 show that the $UV/H_2O_2/Fe^{2+}$ system results in greater removal of dioxane than can be expected by combining the separate $UV/H_2O_2$ and $H_2O_2/Fe^{2+}$ treatment systems.

EXAMPLE 3

A comparison was made of the decomposition of benzene, toluene and xylene (BTX) in a water sample containing BTX using UV; $H_2O_2/Fe^{2+}$; $UV/H_2O_2$; $UV/Fe^{2+}$; and, $UV/H_2O_2/Fe^{2+}$ treatment systems. A water sample containing 8 ppm benzene, 7 ppm toluene and 4 ppm xylene was treated using the method as set out in Example 2, with the exception that the concentration of $H_2O_2$ added to the water sample was 30 ppm and the concentration of $Fe^{2+}$ was 10 ppm.

Figure 4:
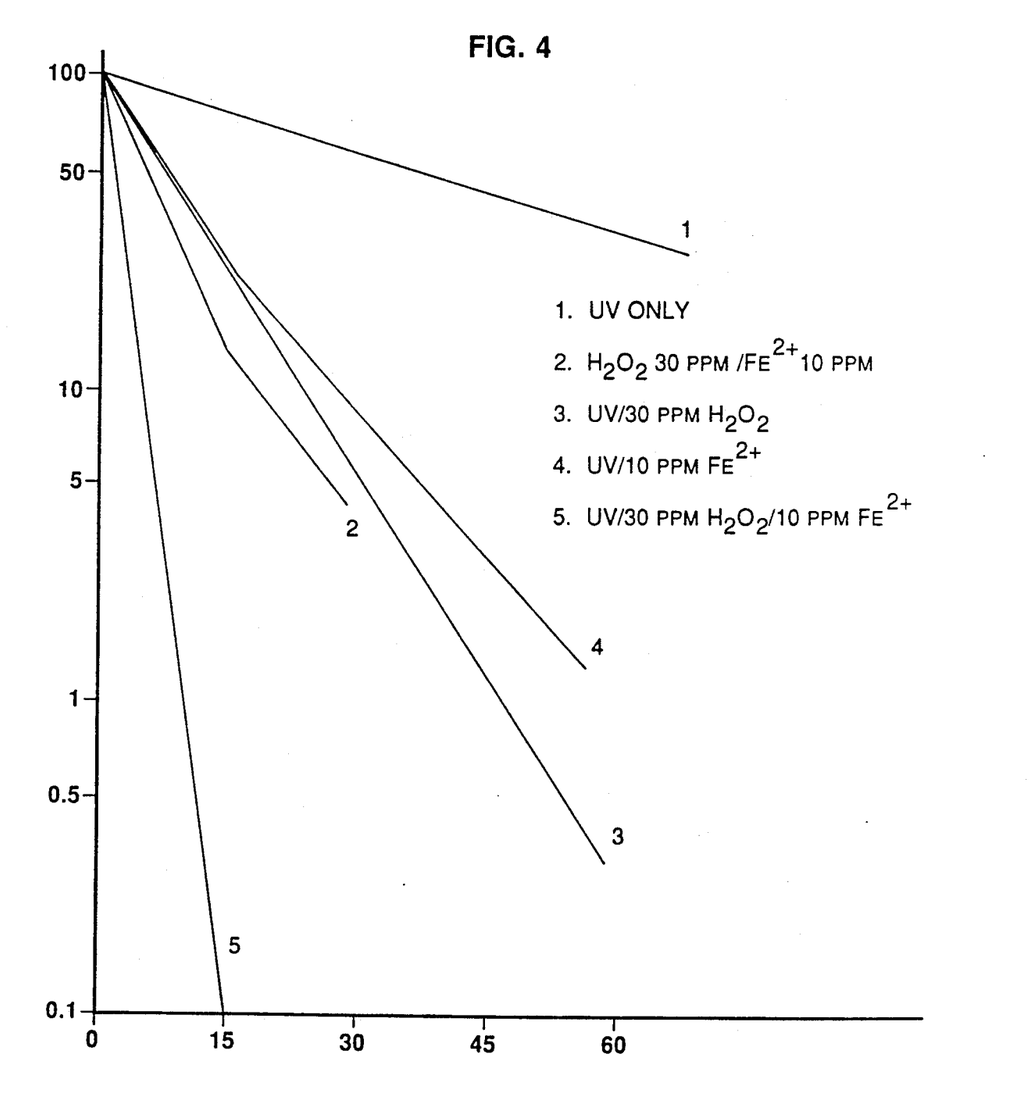
FIG. 4 is a graph showing on a semi-log plot BTX concentration versus time for UV only, $UV/H_2O_2$, $UV/Fe^{2+}$, $UV/H_2O_2/Fe^{2+}$ and $H_2O_2/Fe^{2+}$ treatment systems with a medium/high pressure arc with polychromatic output in the range of 200–400 nm.

The results contained in Table III and graphically represented in FIG. 4, indicate that the treatment system using $UV/H_2O_2/Fe^{2+}$ results in greater decomposition of BTX than can be expected by combining the separate treatments. Thus, this example again demonstrates the synergy of the $UV/H_2O_2/Fe^{2+}$ treatment system.

EXAMPLE 4

A comparison was made of the decomposition of BTX in a water sample containing 8 ppm benzene, 7 ppm toluene and 4 ppm xylene using $UV/Fe^{3+}$ and $UV/H_2O_2/Fe^{3+}$ treatment systems in the method as described in Example 3.

The results contained in Table IV indicate that the decomposition of BTX is insensitive to the form of the iron ion; which substantiates a catalytic decomposition mechanism.

EXAMPLE 5

Figure 5:
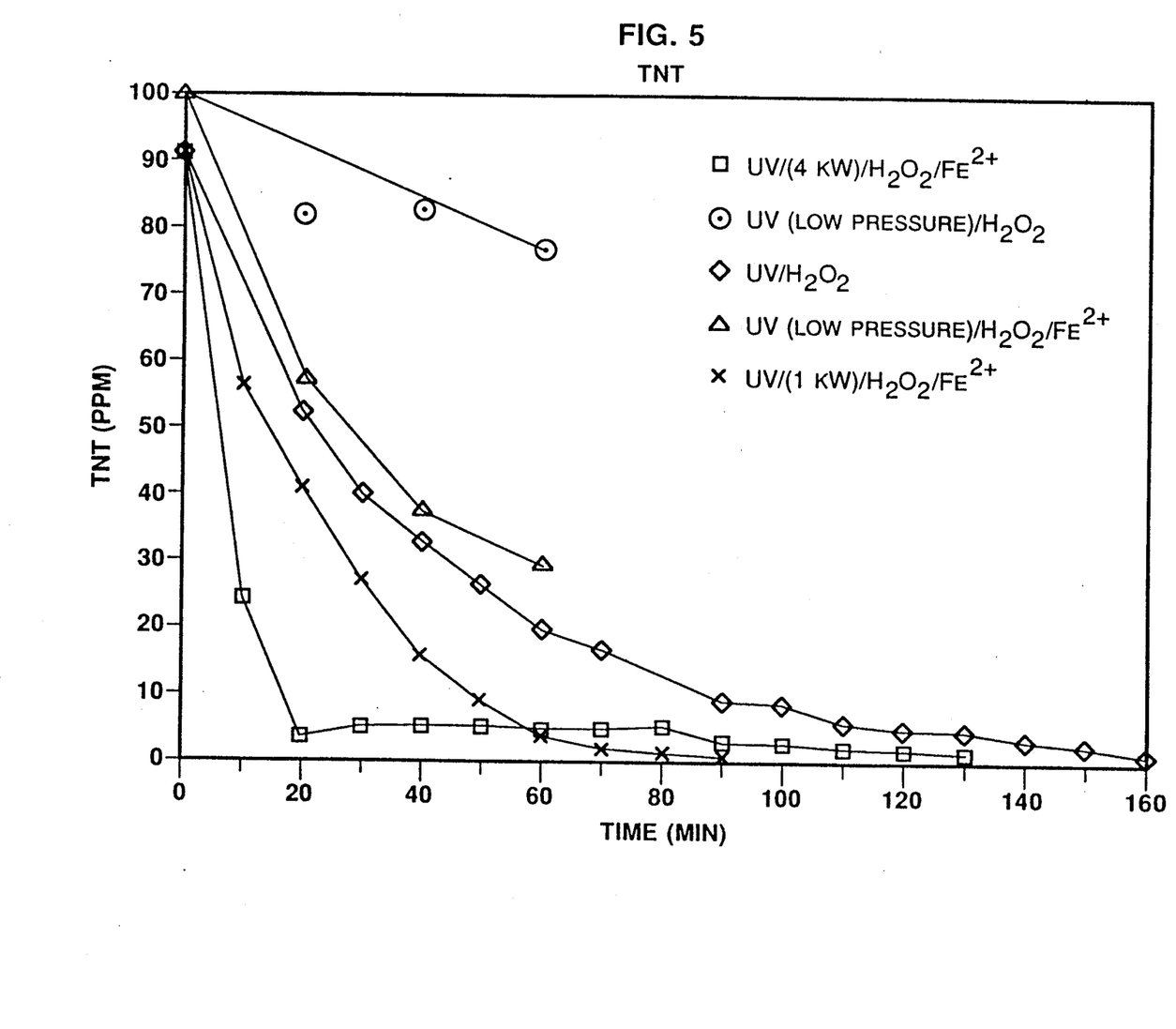
FIG. 5 is a graph showing TNT concentrations versus treatment time for $UV/H_2O_2$ and $UV/H_2O_2/Fe^{2+}$ with a 1 kW medium/high pressure arc with polychromatic output between 200–300 nm; for a $UV/H_2O_2/Fe^{2+}$ treatment system with a 4 kW medium/high pressure arc with polychromatic output between 200–300 nm; and for $UV/H_2O_2$ and $UV/H_2O_2/Fe^{2+}$ treatment systems using a 254 nm monochromatic source.

Industrial wastewater containing TNT was treated with a UV reactor containing a medium/high pressure mercury arc with a continuous output between 200-400 nm of 1 kW (Solarchem, Richmond Hill, Canada, Model #RA 30001) and $UV/H_2O_2$ and $UV/H_2O_2/Fe^{2+}$ treatment systems. The same wastewater was also treated in a UV reactor containing a medium/high pressure mercury arc of 4.4 kW (Solarchem, Model #RB 30033 operating at reduced power) with a continuous output between 200-300 nm and a $UV/H_2O_2$ treatment system. The treatment method was as generally described in Example 2 with the exception that the type of lamp employed was as indicated above, the concentration of $Fe^{2+}$ was 50 ppm, and the concentrations of $H_2O_2$ was 400 ppm. The results are tabulated in Table V and are graphically represented in FIG. 5. The results show that increasing the amount of light significantly increases the decomposition of TNT. Further, adding the $Fe^{2+}$ to the $UV/H_2O_2$ treatment greatly improves the rate of TNT decomposition.

A comparison was made of the decomposition of the TNT in a 10 L water sample using a low pressure mercury arc (25 W) as in Example 1, and the $UV/H_2O_2$ and $UV/H_2O_2/Fe^{2+}$ treatment systems as generally described above. The results given in Table VI indicate that the removal efficiency (time is corrected to indicate an equivalency of power added i.e., kW UV/h L are the same for each system) achieved with the medium pressure arc is much better than can be achieved with the low pressure arc. This is true for both the $UV/H_2O_2$ and $UV/H_2O_2/Fe^{2+}$ system.

EXAMPLE 6

Figure 6:
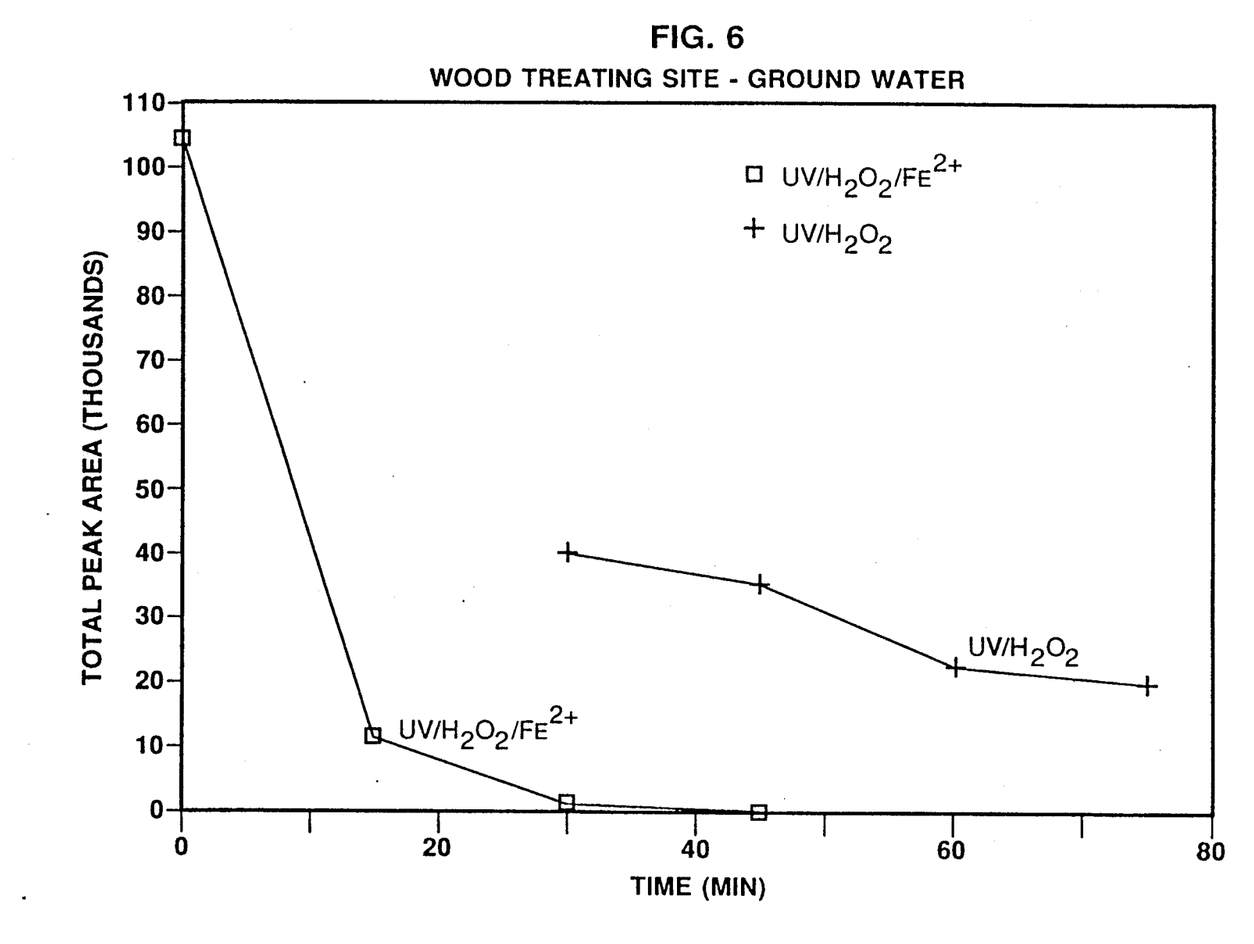
FIG. 6 is a graph showing organic peak area versus treatment time for $UV/H_2O_2$ and $UV/H_2O_2/Fe^{2+}$ treatment systems, treatment of water containing phenolics, and polyaromatic hydrocarbons.

Contaminated groundwater containing a wide range of organics including polyaromatic hydrocarbons and phenolics was treated with $UV/H_2O_2$ and $UV/H_2O_2/Fe^{2+}$ treatment systems. The treatment method was as generally described in Example 2 with the exception that the type of lamp employed was as indicated above and the concentration of hydrogen peroxide in the method using the $UV/H_2O_2$ treatment system was 50 ppm and the concentrations of hydrogen peroxide and $Fe^{2+}$ in the method using the $UV/H_2O_2/Fe^{2+}$ treatment system were 25 ppm and 5 ppm, respectively. Decontamination was quantified using total peak area on a GC trace. The results contained in Table VII and graphically represented in FIG. 6, indicate that with the addition of the $Fe^{2+}$ there is a significant increase in the rate of decomposition.

TABLE I

| | Dioxane (ppm) | | |
|---|---|---|---|
| Treatment System Reaction Time (Min) | UV/100 pm $H_2O_2$ | UV/100 ppm $H_2O_2$ 20 ppm $Fe^{2+}$ | 100 ppm $H_2O_2$ 20 ppm $Fe^{2+}$ |
| 0 | 104 | 100 | 97 |
| 15 | 78 | 71 | 86 |
| 30 | 49 | 59 | 89 |
| 45 | 26 | 45 | 86 |
| 60 | 12 | 31 | 86 |

TABLE II

| | Dioxane (ppm) | | |
|---|---|---|---|
| Treatment System | UV/100 ppm $H_2O_2$ | UV/100 ppm $H_2O_2$/20 ppm $Fe^{2+}$ | 100 ppm $H_2O_2$ 20 ppm $Fe^{2+}$ |
| Reaction Time (min) | | | |
| 0 | 96 | 96 | 92 |
| 15 | 51 | 40 | 82 |
| 30 | 27 | 6 | 81 |
| 45 | 13 | 1 | 81 |
| 60 | 6 | | 82 |
| *Approx. Rate | 0.021 – /00.15 | 0.054 – /0.002 | |

TABLE II-continued

| | Dioxane (ppm) | | |
|---|---|---|---|
| Treatment System | UV/100 ppm $H_2O_2$ | UV/100 ppm $H_2O_2$/20 ppm $Fe^{2+}$ | 100 ppm $H_2O_2$ 20 ppm $Fe^{2+}$ |
| Constant. $min^{-1}$ | | | |

*$\ln \frac{[dioxane]_t}{[dioxane]_o} = kt$ wherein k = rate constant $min^{-1}$.
[dioxane]$_t$ = concentration of dioxane at time t.
[dioxane]$_o$ = concentration of dioxane at time = 0.
t = reaction time (min).

TABLE III

| | Total BTX (% of initial)* | | | | |
|---|---|---|---|---|---|
| Treatment System Reaction Time (min) | UV | $[H_2O_2]$ = 30 ppm $[Fe^{2+}]$ = 10 ppm | UV/ $[H_2O_2]$ = 30 ppm | UV/ $[Fe^{2+}]$ = 10 ppm | UV/$[H_2O_2]$ = 30 ppm $[Fe^{2+}]$ = 10 ppm |
| 0 | 100 | 100 | 100 | 100 | 100 |
| 15 | 72 | 13 | 24 | 23 | 0.1 |
| 30 | 52 | 4 | 6 | 8 | 0.1 |
| 45 | 39 | | 1 | 3 | |
| 60 | 29 | | 0.3 | 1 | |

*Initial concentration of BTX approximately 20 ppm. ethylbenzene also included.

TABLE IV

| | Total BTX* (% of initial) | | | | |
|---|---|---|---|---|---|
| Treatment System Reaction Time (min) | UV/ $[Fe^{3+}]$ = 10 ppm | UV/$[Fe^{3+}]$ = 10 ppm $[H_2O_2]$ = 30 ppm | UV/ $[Fe^{2+}]$ = 10 ppm | UV/$[Fe^{2+}]$ = 10 ppm $[H_2O_2]$ = 30 ppm |
| 0 | 100 | 100 | 100 | 100 |
| 15 | 25 | 0.2 | 23 | 0.1 |
| 30 | 8 | 0.2 | 8 | 0.1 |
| 45 | 3 | | 3 | |
| 60 | 1 | | 1 | |

*Initial Concentration BTX approximately 20 ppm. ethylbenzene also included.

TABLE V

| | TNT (ppm) (Medium/High Pressure UV) | | |
|---|---|---|---|
| Treatment System Reaction Time (min) | UV/$[H_2O_2]$ = 400 ppm | UV/$H_2O_2$ = 400 ppm $[Fe^{2+}]$ = 50 ppm | 4 × UV/ $[H_2O_2]$ = 400 ppm $[Fe^{2+}]$ = 50 ppm |
| 0 | 93 | 91 | 91 |
| 10 | | 57 | 26 |
| 20 | 52 | 41 | 4 |
| 30 | 40 | 28 | 0.2 |
| 40 | 33 | 16 | 0.05 |
| 60 | 20 | 4 | |

TABLE VI

| | TNT (ppm) (Low Pressure UV) | |
|---|---|---|
| Treatment System Reaction Time (min) | UV/ $[H_2O_2]$ = 400 ppm | UV/$H_2O_2$ = 400 ppm $[Fe^{2+}]$ = 50 ppm |
| 0 | 109 | 104 |
| 20 | 89 | 56 |
| 40 | 90 | 36 |
| 60 | 83 | 30 |

TABLE VII

| | Total Organic % of Initial Peak Area | |
|---|---|---|
| Treatment System Reaction Time (min) | UV/$[H_2O_2]$ = 50 ppm | UV/$H_2O_2$ = 25 ppm $[Fe^{2+}]$ = 5 ppm |
| 0 | 100 | 100 |
| 15 | | 12 |
| 30 | 49 | 0.9 |
| 45 | 43 | nd |
| 60 | 29 | |

TABLE VII-continued

| | Total Organic % of Initial Peak Area | |
|---|---|---|
| Treatment System Reaction Time (min) | UV/$[H_2O_2]$ = 50 ppm | UV/$H_2O_2$ = 25 ppm $[Fe^{2+}]$ = 5 ppm |
| 75 | | 25 | nd = not detected

We claim:

1. A method of treating a liquid effluent or groundwater containing organic contaminants comprising the steps of:
  (a) providing a liquid effluent or groundwater containing organic contaminants;
  (b) contacting the liquid effluent or groundwater at a pH of between about 2 and 4 with hydrogen peroxide and transition metal ions, the hydrogen peroxide and transition metal ions being present in effective amounts based on the concentration of the organic contaminants in the liquid effluent or groundwater; and
  (c) irradiating the liquid effluent or groundwater with UV light, the UV light having a polychromatic output between about 200 to 400 nm and an input power of at least about 1 Kw to decompose the organic contaminants;
  wherein the ratio of hydrogen peroxide to transition metal ions is about 10:1 to 1:1 and is selected so as to favor the absorption of UV light by the hydrogen peroxide and the organic contaminant relative to the absorption of UV light by transition metal ions in step (c).

2. The method as claimed in claim 1, wherein the UV light used in step (c) has a polychromatic output between about 200 to 300 nm.

3. The method as claimed in any one of claims 1 or 2, wherein the transition metal ions are supplied by iron or copper compounds.

4. The method as claimed in any one of claims 1 or 2, wherein the transition metal ions are supplied by one or more of $Fe(OH)_3$, $Fe_2O_3$, $FeCl_3$, or $Fe_2(SO_4)_3$.

5. The method as claimed in any one of claims 1 or 2, wherein the transition metal ions are supplied by one or more of FeO, $Fe(OH)_2$, $FeCl_2$, $FeCO_3$ or $FeSO_4$.

6. The method as claimed in any one of claims 1 or 2 wherein the transition metal ions are supplied by FeSO$_4 \cdot 7H_2O$.

7. The method as claimed in any one of claims 1 or 2, wherein the organic contaminants are one or more compounds selected from the group consisting of benzene, toluene, xylene, napthalene, anthracene, chlorobenzene, trinitrotoluene, trichloroethane, trichloroethylene, or dioxane.

8. The method as claimed in any one of claims 1 or 2, wherein the organic contaminants are selected from at least one member of the group of compounds consisting of linear, branched and cyclic alkyls and alkenyls having 1 to 20 carbon atoms, said alkyls and alkenyls consisting of substituted and unsubstituted alkyls and alkenyls, substituents being selected from the group of radicals consisting of fluorine, chlorine, bromine, nitro, sulfo, carboxyl, hydroxyl of $C_1$-$C_{10}$-alkoxy; aromatic and polyaromatic compounds, said aromatic and polyaromatic compounds consisting of substituted and unsubstituted aromatic and polyaromatic compounds, substituents being selected from the group of radicals consisting of linear and branched alkyls and alkenyls having 1 to 10 carbon atoms, fluorine, chlorine, bromine, nitro, sulfo, carboxyl, hydroxyl or $C_1$-$C_{10}$-alkoxy; fused phenols; and, ethers.

9. The method as claimed in any one of claims 1 or 2, wherein the organic contaminants are selected from at least one member of the group consisting of substituted and unsubstituted aromatic and polyaromatic compounds and ethers, substituents being selected from the group of radicals consisting of linear and branched alkyls having 1 to 10 carbon atoms, nitro, chloro and bromo.

10. The method as claimed in any one of claims 1 or 2, wherein the organic contaminants are selected from at least one member of the group consisting of phenolics, substituted and unsubstituted biphenyls and fused phenols, substituents being selected from the group consisting of linear and branched alkyls and alkenyls having 1 to 10 carbon atoms, fluorine, chlorine, bromine, nitro, sulfo, carboxyl, hydroxyl, and $C_1$-$C_{10}$-alkoxy.

* * * * *